(12) United States Patent
Shao et al.

(10) Patent No.: US 7,093,028 B1
(45) Date of Patent: Aug. 15, 2006

(54) USER AND CONTENT AWARE OBJECT-BASED DATA STREAM TRANSMISSION METHODS AND ARRANGEMENTS

(75) Inventors: Huai-Rong Shao, Beijing (CN); Ya-Qin Zhang, West Windsor, NJ (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/464,671

(22) Filed: Dec. 15, 1999

(51) Int. Cl.
*G06F 15/173* (2006.01)

(52) U.S. Cl. ............... 709/240; 709/204; 709/207; 709/219; 709/231; 709/232; 709/235; 709/236; 709/243

(58) Field of Classification Search ......... 709/204, 709/207, 219, 200, 231, 232, 235, 236, 240, 709/243
See application file for complete search history.

(56) References Cited

U.S. PATENT DOCUMENTS

| | | | | |
|---|---|---|---|---|
| 5,548,532 A | * | 8/1996 | Menand et al. | 370/477 |
| 5,729,649 A | * | 3/1998 | Lane et al. | 386/68 |
| 5,923,814 A | * | 7/1999 | Boyce | 386/109 |
| 6,014,694 A | * | 1/2000 | Aharoni et al. | 709/219 |
| 6,057,884 A | * | 5/2000 | Chen et al. | 375/240.16 |
| 6,078,998 A | * | 6/2000 | Kamel et al. | 711/151 |
| 6,092,107 A | * | 7/2000 | Eleftheriadis et al. | 709/217 |
| 6,104,757 A | * | 8/2000 | Rhee | 375/240.12 |
| 6,125,110 A | * | 9/2000 | Proctor et al. | 370/331 |
| 6,147,980 A | * | 11/2000 | Yee et al. | 370/316 |
| 6,175,569 B1 | * | 1/2001 | Ellington et al. | 370/401 |
| 6,185,602 B1 | * | 2/2001 | Bayrakeri | 709/204 |
| 6,188,670 B1 | * | 2/2001 | Lackman et al. | 370/231 |
| 6,205,150 B1 | * | 3/2001 | Ruszczyk | 370/412 |
| 6,320,845 B1 | * | 11/2001 | Davie | 370/230 |
| 6,360,075 B1 | * | 3/2002 | Fischer et al. | 455/3.01 |
| 6,459,682 B1 | * | 10/2002 | Ellesson et al. | 370/235 |
| 6,490,705 B1 | * | 12/2002 | Boyce | 714/776 |
| 6,512,793 B1 | * | 1/2003 | Maeda | 375/240.08 |
| 6,526,062 B1 | * | 2/2003 | Milliken et al. | 370/395.42 |
| 6,546,017 B1 | * | 4/2003 | Khaunte | 370/412 |
| 6,549,938 B1 | * | 4/2003 | Kilkki et al. | 709/207 |
| 6,577,596 B1 | * | 6/2003 | Olsson et al. | 370/230 |

(Continued)

OTHER PUBLICATIONS

S. Fukunaga, et al., "MPEG-4 Video Verification Model version 14.2," International Organisation for Standardisation, ISO/IEC JTC1/SC29/WG11 Coding of Moving Pictures and Audio, Maui, Dec. 1999, pp. 1-387.

(Continued)

*Primary Examiner*—Nabil El-Hady
(74) *Attorney, Agent, or Firm*—Lee & Hayes, PLLC

(57) ABSTRACT

A scalable video transmission scheme is provided in which client interaction and video content itself are taken into consideration during transmission. Methods and arrangements are provided to prioritize/classify different types of information according to their importance and to packetize or otherwise arrange the prioritized information in a manner such that lower priority information may be dropped during transmission. Thus, when network congestion occurs or there is not enough network bandwidth to transmit all of the prioritized information about an object, some (e.g., lower priority) information may be dropped at the server or at an intermediate network node to reduce the bit rate. Thus, when the server transmits multiple video objects over a channel of limited bandwidth capacity, the bit rate allocated to each object can be adjusted according to several factors, such as, e.g., information importance and client interaction.

70 Claims, 7 Drawing Sheets

U.S. PATENT DOCUMENTS

| | | | |
|---|---|---|---|
| 6,587,433 B1 * | 7/2003 | Borella et al. | 370/230 |
| 6,587,985 B1 * | 7/2003 | Fukushima et al. | 714/748 |
| 6,606,413 B1 * | 8/2003 | Zeineh | 382/232 |
| 6,611,875 B1 * | 8/2003 | Chopra et al. | 709/245 |
| 6,633,564 B1 * | 10/2003 | Steer et al. | 370/389 |
| 6,643,258 B1 * | 11/2003 | Ise et al. | 370/230 |
| 6,661,774 B1 * | 12/2003 | Lauffenburger et al. | 370/230.1 |

OTHER PUBLICATIONS

Dapeng Wu, et al., "On End-to-End Architecture for Transporting MPEG-4 Video Over the Internet," IEEE Transactions on Circuits and Systems for Video Technology, vol. 10, No. 6, Sep. 2000, pp. 923-941.

Steven McCanne, et al., "Receiver-driven Layered Multicast," ACM SIGCOMM'96, Aug. 1996, Stanford, CA., pp. 1-14.

* cited by examiner

USER AND CONTENT AWARE OBJECT-BASED DATA STREAM TRANSMISSION METHODS AND ARRANGEMENTS

TECHNICAL FIELD

This invention relates generally to data communications and, more particularly, to prioritization methods and arrangements for selectively transmitting object-based data based on data content in response to dynamically changing network conditions and/or client preferences.

BACKGROUND

Data communication networks are typically divided into two different types of networks based on the techniques used to transmit information between a sending node and a receiving node. The first type or category is a circuit-switched network, wherein a dedicated circuit is established between the sending node and the receiving node prior to the transmission of the information. Information is then transmitted over the dedicated circuit in a continual stream of data. One example of a circuit-switched network is a public-switched telephone network (PSTN). Circuit-switched networks tend to provide a high Quality of Service (QoS) to users since very little, if any, information content is lost during transmission. One of the major drawbacks to circuit-switched networks, however, is that only a limited number of communication sessions or calls can be supported simultaneously by the network. Moreover, in many cases, the communication session fails to fully utilize the available bandwidth of the existing dedicated circuit.

The second type or category is a packet-switched network. In a packet switched network, information is transmitted from the sending node to the receiving node using a plurality of discrete data packets. Each data packet is addressed to the receiving node and selectively forwarded between various nodes within the packet switched network until it reaches the receiving node. At the receiving node, the received data packets are recombined to provide the original information. In this manner, the data packets can travel through the network using a variety of available circuits rather than requiring dedicated circuits. Selective routing techniques are employed to increase bandwidth utilization within the packet-switched network. This allows for support of simultaneous communication sessions, each of which will have an expected QoS. In certain cases, however, the QoS provided during a communication session may fall below the expected QoS, for example, due to lost or untimely receipt of data packets. One example of a packet-switched network is the Internet.

The current Internet essentially treats all data packets as having the same priority during transmission. Therefore, when the Internet is congested, some of the data packets may be dropped or otherwise lost during transmission. Typically, such missing data packets do not significantly degrade the overall QoS of the Internet, since many packets can simply be resent in a timely manner. However, in time-critical data stream transmissions, such as, multimedia (e.g., video, audio, etc.) stream transmissions, missing data packets can significantly degrade the performance of a multimedia application.

Consequently, there is a need for improved techniques that significantly increase the QoS that packet-switched networks, for example, the Internet can provide to time-critical data streaming applications.

SUMMARY

Various methods and arrangements are provided to significantly increase the Quality of Service (QoS) provided by packet-switched networks during the transmission of time-critical data streams, and allow for enhanced interactivity for users accessing such time-critical transmissions. For example, prioritization methods and arrangements are provided for selectively transmitting object-based data based on data content in response to dynamically changing network conditions and/or client preferences.

In accordance with certain aspects of the present invention, a method is provided for use in transmitting media information. The method includes receiving a data bitstream that includes object-based media information, associating portions of the object-based media information with a plurality of different transmission priority levels, and selectively transmitting the portions of the object-based media information over a network that is configured to provide differential services based at least on the plurality of different transmission priority levels.

The method may also include receiving at least one down-stream preference with regard to the object-based media information, and selectively transmitting at least one of the portions of the object-based media information over the network based on the down-stream preference.

In certain implementations, the data bitstream includes object-based media information for a single object, such as, a video object or an audio object. The prioritized portions of the object-based media information can be placed in a plurality of data packets, wherein each data packet is associated with a specific transmission priority. The data within a data packet can include non-contiguous portions of the data bitstream.

In certain other implementations, the object-based media information is encoded using MPEG-4 or other like techniques. Here, media object may be represented by Intra (I) coded frame layers, Predicted (P) frame layers, Bi-directionally (B) predicted frame layers, Intra (I) coded frame enhancement layers, Predicted (P) frame enhancement layers, and Bi-directionally (B) predicted frame enhancement layers. These frame layers may be associated with specific transmission priority levels.

The object-based media information may further include a plurality of different types of video object information, such as, e.g., control information, shape information, motion information and texture information. The transmission priority level for may also be based at least in part on the type of video object information.

The above stated needs and others are also met by an arrangement that includes a server device, at least one client device and at least one communication network. The server device is configured to provide a data bitstream that includes object-based media information having portions of the object-based media information associated with a plurality of different transmission priority levels. The communication network, which is operatively coupled between the server device and the client device, is configured to provide selective differential services based at least on the plurality of different transmission priority levels of the portions of the object-based media information.

A system is also provided, in accordance with certain further aspects of the present invention. In this system, at least one client device is configured to receive prioritized video object-based data packets and output control requests relating to a video object and at least one server device configured to output prioritized object-based data packets representing the video object. The prioritized object-based data packets are prioritized based at least on part on the type of data as selected from a group comprising control data, shape data, motion data, and texture data. The system further includes at least one video transmission agent (VTA), which is coupled to receive the prioritized object-based data packets from the server device and the control requests from the client device, and to selectively output at least a portion of the received prioritized object-based data packets to the client device based in response to the control requests. In certain implementations, the VTA is implemented within a network that is further configured to provide differential services to the prioritized object-based data packets, such that prioritized object-based data packets having lower priority levels are selectively dropped should the network become congested.

In accordance with still further aspects of the present invention, a computer-readable medium is also provided having a data structure, wherein a first field contains identifying data associated with a portion of a data bitstream that represents a video object, and at least one second field that is derived from the first field and includes data representing object-based video information for the video object that has been classified as having a specific transmission priority level based on at least one type of object-based video information selected from a group comprising control information, shape information, motion information, and texture information.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
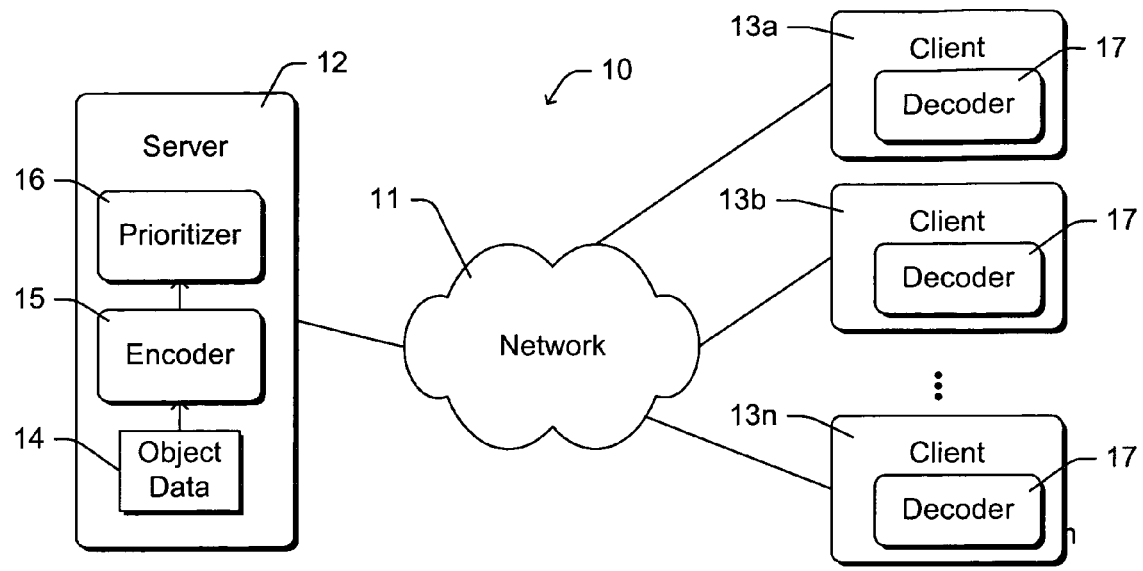
FIG. 1 is a block diagram depicting an exemplary communications system having a network that is configured to provide data bitstream communication services between at least one server device and a plurality of client devices, in accordance with certain aspects of the present invention.

FIG. 1 is a block diagram depicting an exemplary communications system 10 having a packet-switched network 11 that is configured to provide packet-switched communication services between at least one server device 12 and a plurality of client devices 13(a) . . . 13(n), in accordance with certain aspects of the present invention. Although network 11 is referred to as a "packet-switched" network, portions of network 11 may also include circuit-switched links. For example, client device 13a may be operatively coupled to network 11 through a dedicated circuit-switched telephone line. In certain implementations, for example, at least a portion of network 11 can provide differential service capabilities.

As depicted, server 12 is configured to generate or otherwise provide object data 14 to an encoder 15. The object data can include "media data", such as, video data, image data, audio data, text data, computer instructions, associated control data, etc. The media data can include real world information (e.g., still/moving image from a digital camera) and/or synthetic information (e.g., virtual images). Object data 14 can represent a two-dimensional or three-dimensional object.

Encoder 15 is configured to encode the object data into one or more data bitstreams. Encoder 15, in certain implementations, is a Moving Picture Experts Group (MPEG) based encoder. MPEG is the name of a family of standards used for coding audio-visual information (e.g., movies, video, music) in a digital compressed format. Preferably, encoder 15 includes the requisite hardware and/or software to meet the standards of the MPEG-4 or later standards, or other similar standards that encode media objects into data bitstreams.

One advantage of MPEG compared to other video and audio coding formats is that MPEG files are much smaller for the same quality. This is because MPEG uses very sophisticated compression techniques to code frames, or as is the case in MPEG-4 to code objects as separate frame layers.

There are three types of coded frames. The first type is an "I" or intra frame, which is a frame coded as a still image without using any past history. The second type is a "P" or Predicted frame, which is predicted from the most recent I frame or P frame. Each macroblock of data within in a P frame can either come with a vector and difference differential cosine transform (DCT) coefficients for a close match in the last I or P, or it can be "intra" coded (e.g., as in the I frames). The third type is a "B" or bi-directional frame, which is predicted from the closest two I frames or P frames, e.g., one in the past and one in the future. There are typically 12 frames from 1 frame to I frame (e.g., a sequence of frames may be . . . IBBPBBPBBPBBIBBPBBPB . . . ).
Additionally, enhancement I, P, or B frame layers may be provided to add additional refinement/detail to the image. These and other features of the MPEG standard are well known.

MPEG-4 provides the capability to further define a scene as having a one or more media objects. For video object, each of these media objects is encoded into a corresponding elementary data bitstream using I, P, B, and enhancement frame layers. In this manner, MPEG-4 (and other similarly arranged standards) can be dynamically scaled up or down, as required, by selectively transmitting elementary bitstreams to provide the necessary multimedia information to a client device/application.

Server device 12 further includes a prioritizer 16 that is configured to receive at least one data bitstream from encoder 15. Prioritizer 16 examines the data bitstream and reconfigures the data bitstream in a plurality of data packets based on data content. For example, in certain implementations, prioritizer 16 considers the frame type (e.g., I, P, B, etc.) when reconfiguring the data bitstream into a plurality of data packets. In certain other exemplary implementations, prioritizer 16 considers the content of the data (e.g., control, shape, motion, texture, etc.) when reconfiguring the data bitstream into a plurality of data packets. In still other implementations, prioritizer 16 considers both the frame type and the content of the data when reconfiguring the data bitstream into a plurality of data packets. In any of these cases, prioritizer 16 may also consider feedback/control inputs received from other devices/programs, for example, a client device 13 and/or a network 11 resource.

In this manner, prioritizer 16 can be arranged to reconfigure the data bitstream into a plurality of "prioritized" data packets. Prioritizer 16 can dynamically adjust the prioritization scheme based on inputs received from resources within network 11, and/or from inputs received from a client 13. These and other features will be described in future detail below.

By way of further example, the information in the data bitstream of object-based video coding, such as, MPEG-4, can be divided into the following types of information:
1. Control information, (e.g., Video Object Head, Video Object Layer Head and Video Object Plane head);
2. Shape information of an Intra (I) coded frame base layer
3. Texture DC information of an Intra (I) coded frame base layer
4. Texture AC information of an Intra (I) coded frame base layer
5. Shape information of a Predicted (P) frame base layer
6. Motion information of a Predicted (P) frame base layer
7. Texture information of a Predicted (P) frame base layer
8. Shape information of a Bi-directionally (B) predicted frame base layer
9. Motion information of a Bi-directionally (B) predicted frame base layer
10. Texture information of a Bi-directionally (B) predicted frame base layer
11. Intra (I) coded frame enhancement layer
12. Predicted (P) frame enhancement layer
13. Bi-directionally (B) predicted frame enhancement layer The preceding types of information can be selectively classified as having different transmission priority levels. Thus, for example, without considering the enhancement layers, the base layers of compressed information may be classified as follows:

CLASS 0: Control information.
CLASS 1: Shape information of the Intra (I) coded frame base layer and texture DC information of the Intra (I) coded frame base layer.
CLASS 2: Texture AC information of the Intra (I) coded frame base layer.
CLASS 3: Shape information of the Predicted (P) frame base layer and motion information of the Predicted (P) frame base layer.
CLASS 4: Texture information of the Predicted (P) frame base layer.
CLASS 5: Shape information of the Bi-directionally (B) predicted frame base layer, motion information of the Bi-directionally (B) predicted frame base layer and texture information of the Bi-directionally (B) predicted frame base layer.

Prioritizer 16, having examined the data bitstream and packetized or otherwise rearranged the data according to different priority levels, then sends the resulting data packets to network 11. If network 11 cannot satisfy the rate requirement associated with the resulting data packets, then data packets having the lowest transmission priority level will be discarded, as needed.

To maintain compliance with MPEG-4 syntax, an index table for each video object is generated without defining a new syntax of the video object bitstream. The index table includes several items, such as index number, information category, priority level, starting position (relative) and length, to index different information in the compressed bitstream within the data packets. The index table is a virtual table that is used only as a reference for extraction of different parts of the information and doesn't constitute part of the bitstream. By way of example, the data structure of the index item may be implemented as follows:

typedef struct
{char name[30]; //information category
int priority; //class level
int startpos; //starting position of this part information within the bitstream
int length; //length of this part information
bool VOPEndFlag; //label of the end of a frame of the video object
}IndexItem;

Each of the client devices 13(a)–13(n) includes a decoder 17 that is configured to receive data from network 11. In certain implementations, for example, decoder 17 is configured to receive at least a portion of the data packets from prioritizer 16, regenerate at least a portion of the encoded data bitstream, decode the resulting data bitstream, and output all or part of object data 14.

In certain other implementations, one or more resources within network 11 may be configured to regenerate at least a portion of the encoded data bitstream using at least a portion of the data packets output by prioritizer 16. For example, a server, gateway, router, or other like device may be provided within network 11 to perform this task. In still other implementations, prioritizer 16 may alternatively be included at least partially within various network 11 resource(s).

Figure 2:
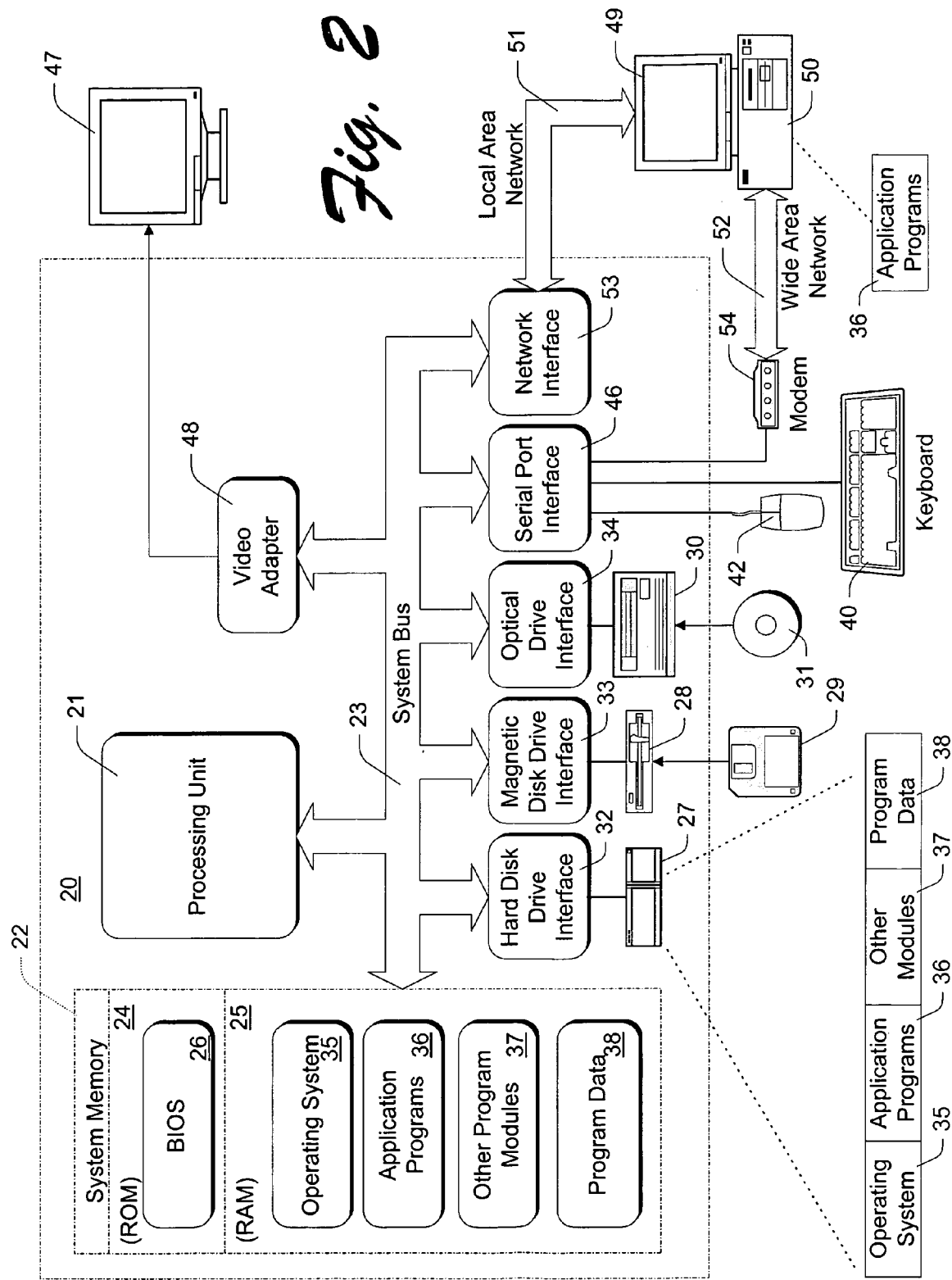
FIG. 2 is a block diagram depicting an exemplary computer that can be employed as a server device and/or a client device in the communications system of FIG. 1.

Reference is now made to FIG. 2, which is a block diagram depicting an exemplary computer 20 that can be employed within server device 12 and/or client devices 13(a)–13(n), for example, to provide or otherwise support data bitstream communications. Those skilled in the art will clearly recognize that different computing and communication resources and configurations can be operatively configured to form computer 20 or otherwise perform the functions of network 11, server device 12, and client devices 13(*a*)–13(*n*). For example, a client device 13 may include a cellular telephone, a pager, or other wireless device that is operatively coupled to network 11.

As shown in this example, computer 20 includes one or more processors or processing units 21, a system memory 22, and a bus 23 that couples various system components including the system memory 22 to processors 21. Bus 23 represents one or more of any of several types of bus structures, including a memory bus or memory controller, a peripheral bus, an accelerated graphics port, and a processor or local bus using any of a variety of bus architectures.

The system memory includes read only memory (ROM) 24 and random access memory (RAM) 25. A basic input/output system (BIOS) 26, containing the basic routines that help to transfer information between elements within computer 20, such as during start-up, is stored in ROM 24.

Computer 20 further includes a hard disk drive 27 for reading from and writing to a hard disk, not shown, a magnetic disk drive 28 for reading from and writing to a removable magnetic disk 29, and an optical disk drive 30 for reading from or writing to a removable optical disk 31 such as a CD ROM, DVD ROM or other optical media. The hard disk drive 27, magnetic disk drive 28 and optical disk drive 30 are each connected to bus 23 by applicable interfaces 32, 33 and 34, respectively.

The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to bus 23.

A monitor 47 or other type of display device is also connected to bus 23 via an interface, such as a video adapter 48. In addition to the monitor, personal computers typically include other peripheral output devices (not shown) such as speakers and printers.

Computer 20 can operate in a networked environment using logical connections to one or more remote computers, such as a remote computer 50. Remote computer 50 may be another personal computer, a server, a router, a network PC, a peer device or other common network node, and typically includes many or all of the elements described above relative to computer 20. The logical connections depicted in FIG. 2 include a local area network (LAN) 51 and a wide area network (WAN) 52. Such networking environments are commonplace in offices, enterprise-wide computer networks, intranets, and the Internet.

When used in a LAN networking environment, computer 20 is connected to the local network 51 through a network interface or adapter 156. When used in a WAN networking environment, computer 20 typically includes a modem 54 or other means for establishing communications over the wide area network 52, such as the Internet. Modem 54, which may be internal or external, is connected to bus 23 via interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Future generations of the Internet Protocol will provide differential service, whereby data packets will be treated as having a specified priority. Thus, for example, when the Internet or a portion thereof is congested, data packets with lower priorities may get dropped/delayed to better insure that packets with higher priorities get delivered. This allows for different QoS's to be provided based on the importance associated with the user and/or information content. The QoS class of each data packet can be specified, for example, using a type of service (TOS) byte within the Ipv4 header or a traffic class byte within the Ipv6 header (IPH) of the data packet.

Prioritization of object-oriented video information may be advantageously implemented using this type of differential service capability to provide a scalable video differentiated transmission scheme in which media objects that are identified in a video frame, or portions thereof, are associated with various differential priorities during transmission. Thus, for example, different kinds of information, such as, shape, motion and texture information, within the data bitstream are associated with specific transmission priority levels. In certain implementations, the transmission priority levels associated with the information will significantly match the level of importance that the information inherently has within the decoding process in decoder 17. Thus, for example, shape information as described in the earlier example may be more important than motion or texture information.

The resulting differentially prioritized data stream has many benefits. For example, the resulting prioritized data stream can be used to better control data flow at server 12 or within network 11, meet QoS requirements, enhance user interaction capabilities, and/or better support multicasting services to a plurality of receiving nodes 13(*a*)–13(*n*).

Figure 3:
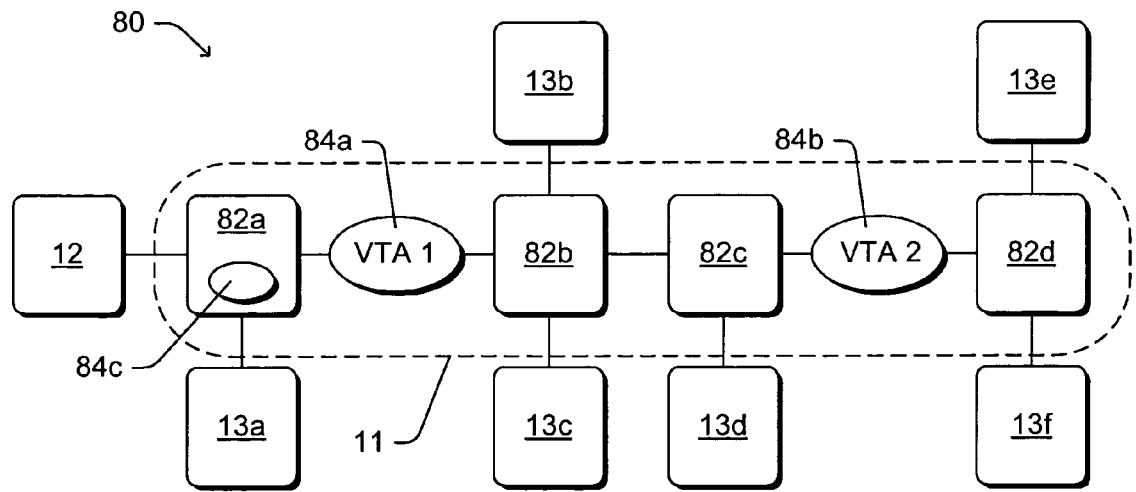
FIG. 3 is a block diagram depicting a user-aware object-based video multicasting system architecture that can be employed in the communications system of FIG. 1.

With this in mind, reference is now made to FIG. 3, which is a block diagram depicting a user-aware object-based video multicasting system architecture that can be implemented in communications system 10.

In FIG. 3, server device 12 is operatively coupled to a first network node 82*a*. Here, network nodes 82*a–d* can be any type of general purpose and/or special purpose computing/communication device, such as, a server, a gateway, a router, a computer, etc. Client device 13*a* is operatively coupled to receive data packets from network node 82*a*. The output of network node 82*a* is provided to a first video transmission agent (VTA) 84*a*. VTA 84*a* is configured selectively filter out or otherwise drop data packets according to their respective transmission priority levels based on network and/or other recognized needs (e.g., downstream feedback/control).

The output from VTA 84*a* is provided to a second network node 82*b*, which is operatively coupled to provide data packets to client devices 13*b*, 13*c* and third network node 82*c*. Network node 82*c* is operatively coupled to provide data packets to client device 13*d* and a second VTA 84*b*. VTA 84*b* is configured to selectively filter out or otherwise drop data packets according to their respective transmission priority levels based, again, on network and/or other recognized needs. The output from VTA 84b is provided to a fourth network node 82d, which is operatively coupled to provide data packets to client devices 13e and 13f.

An optional third VTA 84c is also shown as being included within network node 82a. VTA 84c may be operatively configured to selectively control the data packets that are provided to client device 13a.

Figure 4:
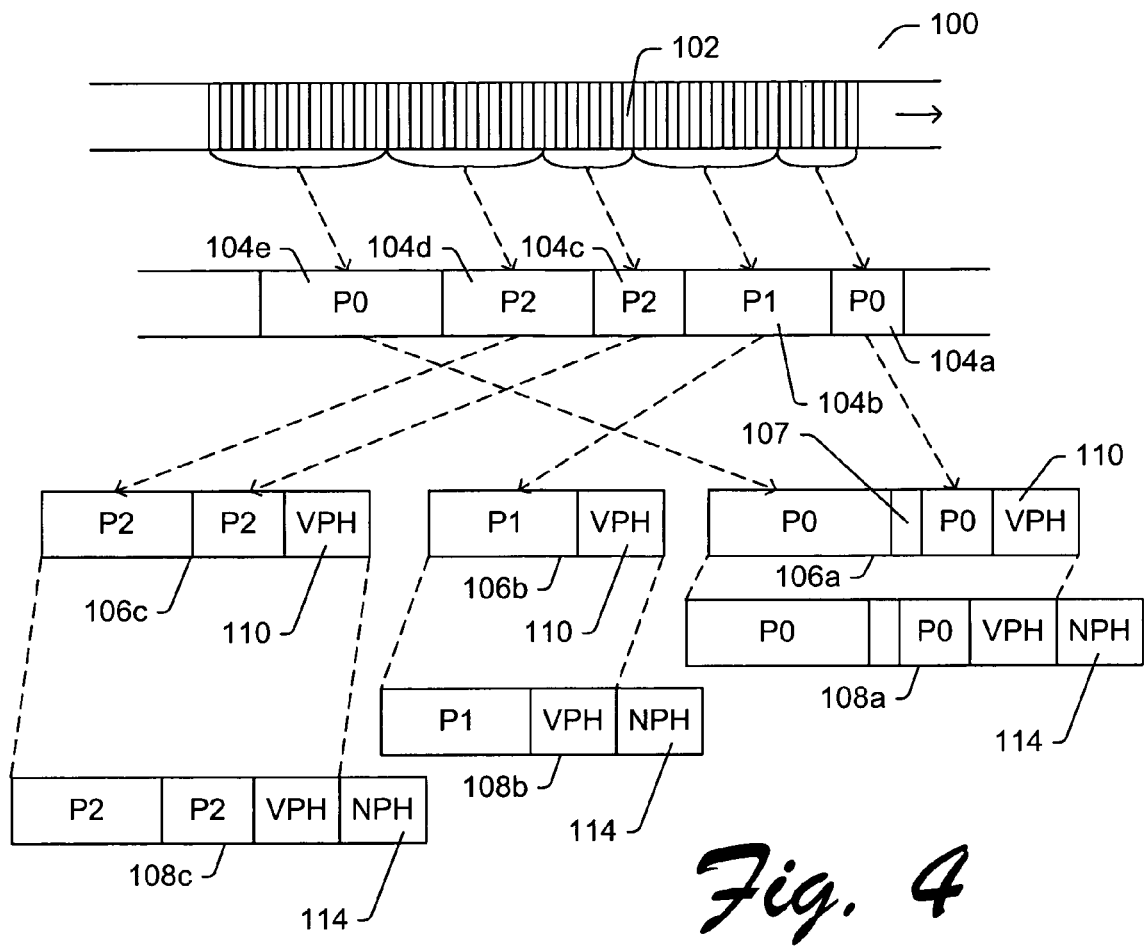
FIG. 4 is a block diagram that illustratively depicts an exemplary method/arrangement for prioritizing and packetizing a data bitstream for transmission over the communications system of FIG. 1.

FIG. 4 is a block diagram that illustratively depicts an exemplary method and/or arrangement for prioritizing and packetizing media object data from an encoded bitstream. As shown, an encoded data bitstream 100 having data 102 is provided. Next, the data bitstream is examined to identify portions 104a–e, each of which is associated with a specific transmission priority level. The portions 104a through 104e are then placed in data packets 106a–c having a corresponding video packet header (VPH) 110.

As shown in this example, portion 104a has a priority level of "P0", portion 104a has a priority level of "P0", portion 104b has a priority level of "P1", portion 104c has a priority level of "P2", portion 104d has a priority level of "P2", and portion 104e has a priority level of "P0". Thus, data packet 106a includes portions 104a and 104e, each of which has a transmission priority level of P0. Identifying bits 107 are provided in data packet 106a to identify that portions 104a and 104e are not contiguous within data bitstream 100.

Similarly, data packet 106b includes portion 104b, which has a transmission priority level of P1, and data packet 106c includes portions 104c and 104d, each of which has a transmission priority level of P2.

Data packets 106a–c are then each further configured for transmission over network 11, for example, by adding a Network header (NPH) 114 to create data packets 108a–c, respectively. By way of example, NPH may be TCP Header+ IP Header, UDP header+IP Header, IP Header, or other format. NPH 114 identifies the transmission priority level.

Figure 5:
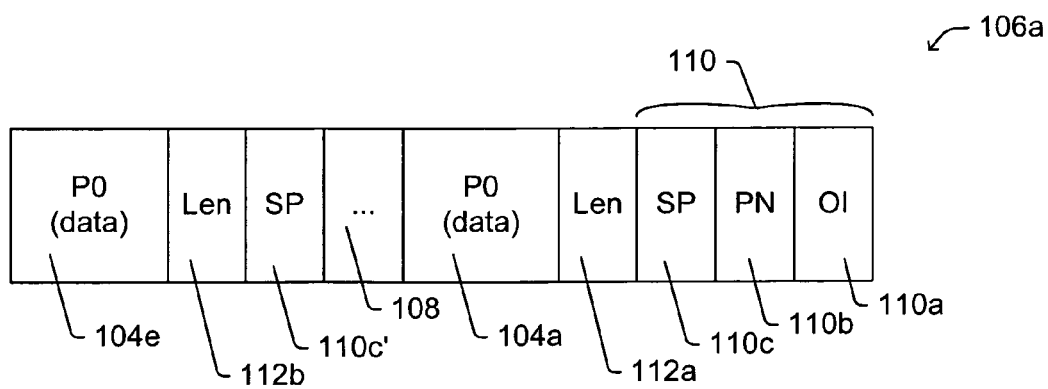
FIG. 5 is a block diagram that illustratively depicts an exemplary format of a prioritized data packet that can is used in the method/arrangement of FIG. 4.

An exemplary data packet 106a is depicted in FIG. 5. As shown, VPH 110 includes an object identifier (OI) 110a, a part number (PN) 110b and a starting position (SP) 110c for the first portion (or contiguous portions) of data in data packet 106a (i.e., here, portion 104a). Additionally, a length (LEN) 112a is provided to establish the length of the first portion (or contiguous portions). Additional SP 110c and LEN 112b data are provided following identifying bits 107 to further define portion 104e. The identifying information in 106a can be used to reconstruct the data bitstream 100, or remaining portion thereof, after transmission over network 11.

In certain implementations, a video packet 106 is limited in size so as to not exceed the MTU of network 11. Additionally, a video packet 106 should not be too small to increase efficiency.

Figure 6:
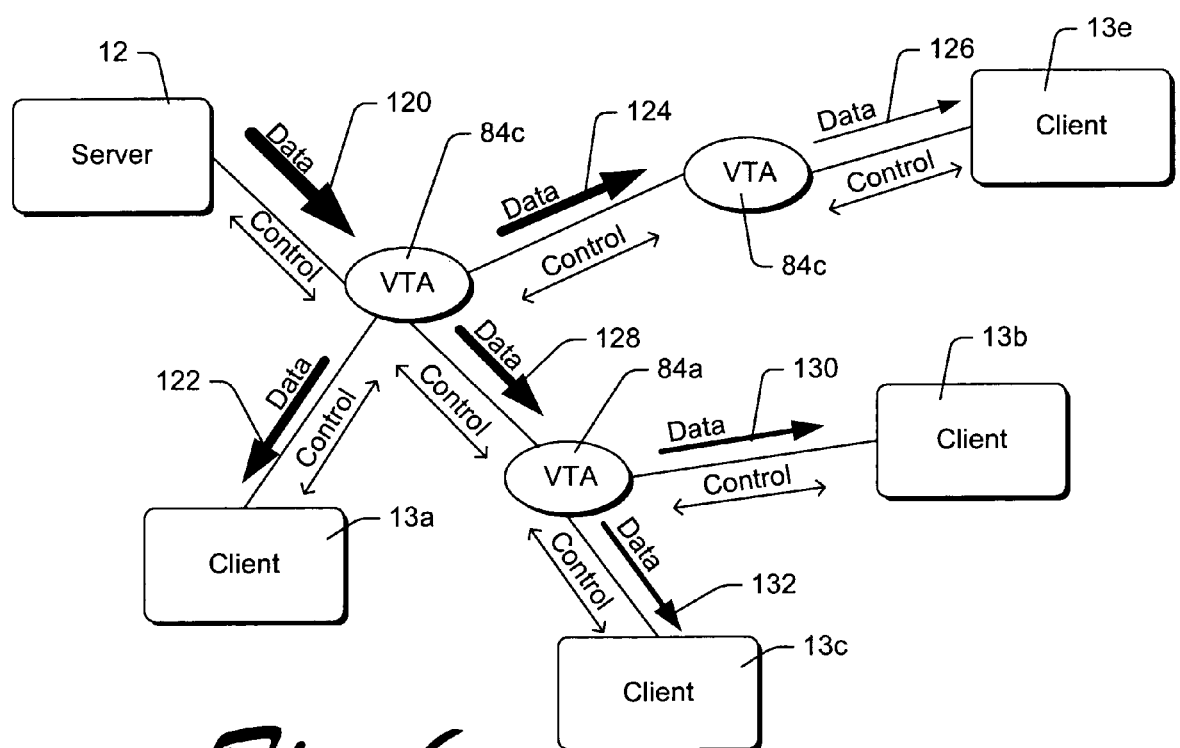
FIG. 6 is a block diagram illustratively depicting certain packetized data paths and associated control paths in the multicasting system architecture of FIG. 3.

FIG. 6 is a block diagram illustratively depicting how a plurality of VTAs can be used to control the flow of packetized data between server device 12 and a plurality of clients 13a, 13b, 13c, and 13e with respect to multicasting of video data. In this example, the various nodes have bi-directional feedback/control communication capabilities through which client device software is configured to relay user inputs with respect to selected media objects and/or other related interactive features. Thus, for example, a user may select a specific video object within a scene through a graphical user interface. This selection will be sent upstream to one or more VTAs and possibly to the server device 12 itself, if needed, to elicit the proper response in the packetized data that is sent downstream.

In this manner, the VTAs are able to respond dynamically to the needs of the client devices. As mentioned above, the VTAs may also respond to network related constraints. Thus, both network and user interactivity behaviors are taken into consideration.

The user can interact with a video player application program running on the client device, for example, and the server device through several ways such as mouse click, mouse moving, forward, backward, object zoom in, object zoom out, add objects, delete objects, etc. These interaction behaviors can influence the amount of network bandwidth allocated to individual object dynamically.

Accordingly, the control paths provide a mechanism for negotiating or otherwise establishing what object data 14 needs to be transmitted and how best to allocate limited bit rate among multiple video objects according to network state and users' interaction.

By way of further example, let us assume that server device 12 is multicasting object-based MPEG-4 video to the four clients. Server device 12 will packetize the bitstream of each requested video object and send data packets with different transmission priority levels (e.g., different QoS requirements). Should congestion occur within network 11 during transmission, one or more network nodes 82 may need to discard data packets having lower priority levels.

The VTAs will filter out data packets from upstream according to downstream requirements (e.g., according to the network link and a particular clients capabilities). For example, data packets containing texture information for a particular video object may be dropped by the VTA.

This capability is graphically depicted by the varying width of data flow arrows 120, 122, 124, 126, 128, 130, and 132; here, wider data arrows represent more data packets being transmitted. Thus, for example, VTA 84c (and possibly other network resources) has dropped some of the data packets received from server device 12 prior to providing the remaining data packets to VTA 84c, since arrow 120 is wider than arrow 124.

With this in mind, a new scalable video transmission technique is provided in which the user's interaction and at least portions of the video information content itself can be taken into consideration. This novel technique allows for efficient object-based video transmission over IP based networks or other network architectures that provide differentiated services.

The techniques include smart packetization processes that distinguish between different types of data in a bitstream, object-based bit rate control and adaptation processes corresponding to users' interactions and selections, and selective transmission processes that drop data packets as needed to take advantage of differentiated classes. The packetization scheme can take advantage of object boundary, MB (macro block)/MV (motion vector) structure, shape information, and the nature of differential services architecture. The bit rate of a video stream can be adjusted to network state by discarding low priority packets.

The VTAs represent a novel object-based video streaming mechanism that has capability of providing dynamic interaction between users and video contents. A VTA can dynamically adapt the bit rate of each video object to the user's interactivity behaviors.

As demonstrated by the foregoing detailed description and drawings, the various methods and arrangements can be implemented to provide error control and scalability for compressed video data over the Internet. During transmission, the data within a compressed video bitstream is packetized and the packets are sent to the receiver over the Internet. Although some of the data packets may be lost during transmission, their loss will not necessarily lead to failure in the decoding process since different types of data within the data bitstream, such as, e.g., shape, motion and texture information have been essentially re-clustered and assigned to different transmission priority levels/classes. Consequently, higher priority classes of data packets will have lower packet loss rate than relatively lower priority classes of data and obtain increase error control protection.

This prioritization technique has the additional benefit of allowing changes to be made to the transmission rate of the video just by selectively discarding lower priorities packets at server 12 and/or at intermediate network nodes 82. Moreover, the methods and arrangements are particularly useful in supporting multicasting applications/services.

Multicasting is regarded as an effective communication support for multi-party multimedia applications, such as, distance learning and video broadcasting. However, due to the heterogeneity of the Internet a single sender transmission rate cannot satisfy the different bandwidth requirements of different clients. Typically the sender rate is adapted to meet the requirements of the worst positioned client, thereby reducing the quality of the video data for other clients. While such limitations may be partially overcome using conventional layered transmission mechanisms, wherein each layer (elementary bitstream) is sent over a separate network session, it is complicated for the network to maintain multiple sessions for each video object and the synchronization control between different layers is difficult to achieve. In addition, the transmission rate cannot be adjusted to a granularity that is smaller than the difference between layers. The methods and arrangements described herein provide a novel heterogeneous multicasting mechanism that solves these and other problems within layered and worst-case multicasting approaches. Through this prioritized single layering approach different clients can receive different quality levels of multimedia data bitstreams.

With respect to video, for example, after encoding/compressing, the compressed video data are placed in a data bitstream according to temporal and spatial position of its content, i.e., frame by frame, macroblock by macroblock, and block by block, etc.

Traditionally, different types of information such as shape, motion and texture information would have been interleaved together at this stage, despite the fact that each has an inherent and different level of importance during the decoding process. For example, shape and motion information is usually more important than texture within a P frame. Consequently, if the shape and motion information is lost during transmission, decoder 17 will be unable to output the uncompressed P video frame even though it received texture information. However, shape and motion information may be enough for decoder 17 to generate a coarse video frame that will have a lower quality than the original frame due to the loss of texture information.

Moreover, at present, rate control for video is mainly implemented by changing the encoding quatization size, selecting another optimal mode or 1 reducing the frame rate within encoder 15. For many applications 36, such as, for example, video on demand (VOD), video materials are encoded and stored at server 12 in advance. Therefore, the bit rate cannot be subsequently changed to adjust the network resource availability. For those adopting real-time encoding, if the encoded video needs to be sent to multiple heterogeneous receivers simultaneously, the single bit rate may not satisfy all receivers. By employing a smart prioritization/packetization and rate control approach the methods and arrangements can be better configured to control and respond to the communication needs of the clients. For example, the methods and arrangements can take advantage of object boundary, MB (Macro Block)/MV (Motion Vector) structures, shape information, and even future generations of the Internet infrastructure which is expected to provide differentiated services.

Thus, when network resources are unable satisfy the rate requirement(s) of the video bitstream, information with the lower priorities will be selectively discarded by server 12 or intermediate network nodes. In addition, different error control mechanisms may be implemented on different priorities information to further enhance the overall error resilience capability of the transmission.

By way of further example, since the rate control is supported by discarding some information, let us assume that there are N priority levels $P_i$ (0<=i<N), each level information has the original bit rate $r_i$(0<=i<N), and the original rate of the whole video stream is R. Therefore, $$R \int_{i0}^{N1} r_i$$

During transmission, if network congestion occurs and/or the receivers require lower bit rates (e.g., as specified through some sort of user-interactivity behavior), then the bit rate for the video object needs to be reduced to R'.

First, the suitable k(0<k<N) needs to be found which satisfy the following form:

$$\int_{i0}^{k1} r_i \delta R' \int_{i0}^{k} r_i$$

Wherein, all information with priorities $P_j$ (k<j<N) will be discarded at the sender.

Secondly, if $$R' \int_{i0}^{k1} r_i,$$

all packets with priorities Pk will also be discarded at the sender; otherwise, some fine bit rate adjustment will be implemented. This means some packets with priority Pk will be selectively discarded at the sender and/or the intermediate nodes. For example, if some information within a B frame needs to be dropped, then a selective B frame discarding scheme as proposed by Hemy et al., "MPEG System Streams in Best-Effort Networks", Packet Video'99, New York, can be adopted. In another example, if texture information within a P frame needs to be partly discarded, the approach can randomly discard "A" percentage of P frame texture information, wherein:

$$\cdot A \frac{\int_{i0}^{k} r_i R'}{r_k} \upsilon 100\%$$

As can be seen, the rate control mechanism provides for both the temporal scalability and quality scalability support.

Moreover, as described above, such a scalable transmission scheme can also take advantage of differentiated services by providing the selective filtering capability of a VTA 84. The resulting layer approach allows different users to receive different quality levels of video data bitstreams. VTA 84 and associated (Capacity, Requirement) resource allocation policy may be implemented to provide a more flexible multicasting mechanism.

Here, an exemplary VTA 84 is configured to receive video data bitstreams from server 12 or a previous VTA, filter the received data bitstream by selectively discarding data packets having lower priorities, and sending the resulting filtered data bitstream to a client 13 and/or a next (downstream) VTA 84. VTA 84 may also be configured to receive requests from one or more clients and/or other VTAs, act upon requests or generate a combined request from requests of multiple clients or next VTAs and forward it to previous VTAs, provide bandwidth allocation coordination among multiple data bitstreams, and/or even provide dynamic bandwidth re-allocation according to the semantic information of video object, such as, for example, when a scene change is identified within the data bitstream as occurring.

By way of further example, VTA 84 can be implemented as a component of the router or gateway, a server or part of a server attaching to the router, and configured to watch a known port, intercept requests and adapt the data bitstream accordingly. Thus, as depicted in FIGS. 3 and 6, VTAs can be implemented at various nodes within network 11 to provide for multiple filters along the path from server 12 to client 13. A resource allocation policy, e.g., (Capacity, Requirement) policy, can be employed within VTA 84 to support multicasting. For example, in a multicasting session, every VTA and client is associated with a two element set, namely "Capacity" and "Requirement". Capacity represents the amount of the resource available for a video object in the VTA or the end system of the user to handle the video object. Requirement represents the amount of the resource for a video object required by the VTA or the user. Concerning the network bandwidth, the Capacity of a VTA is determined by the link state between the VTA and its next upstream VTA (or the server 12 if it has no upstream VTA). Let us assume that the capacity of the sender is the bit rate of the original bitstream, denoted as $RATE_s$. However, the Requirement of a VTA is determined by $(Capacity, Requirement)_s$ of all its next downstream VTAs and the clients connecting directly to this VTA. For example, if a VTA, named $V_i$, has M next downstream VTAs and clients whose two element set are $(Cap_{ij}, Req_{ij})$ (0<=j<M), then the Requirement of $V_i$ is calculated as follows:

$$Req_i = \min\{\min(Cap_{ij}), \max(Req_{ij}), RATE_s\}$$
$$(0<=j<M).$$

For a client, Requirement will likely be determined by the user's preference and interactivity behavior.

For a multicasting session, the $(Capacity, Requirement)_s$ of its VTAs and clients can be calculated following the direction from bottom to top (i.e., moving upstream). And at each $VTA_i$, the rate of the video object bitstream can be adapted to $Req_i$ by using the scalable transmission scheme proposed herein.

As can be seen, the VTAs have the functionality of filtering. However, traditional video filter needs to implement decoding and re-encoding to complete the filtering. Here, however, the VTAs can implement the filtering by only discarding some less important packets in a much simpler and faster fashion than traditional filters.

In accordance with certain experimental implementations, a simple MPEG-4 video streaming system is used to test a scalable multicasting scheme. The test bed included MPEG-4 video encoding/decoding source code and Ipv6 protocol stack source codes. A standard Akiyo QCIF video sequence was used in the experiment. Exemplary results from the experiment are depicted in the images/graphs in FIGS. 7–11.

As shown in the two examples of FIGS. 7, 8 and FIGS. 9, 10 the approaches taught by the methods and arrangements perform better than traditional approaches under the same network bandwidth and packet loss conditions.

Figure 7:
FIG. 7 includes two exemplary video frame images for comparison purposes following a simulated loss of 4.1% of the data packets during transmission, wherein the frame image on the left is noticeably degraded due to the lost data, while the frame image on the right is significantly less degraded due to lost data as a result of the method/arrangement for prioritizing and packetizing a data bitstream.
Figure 8:
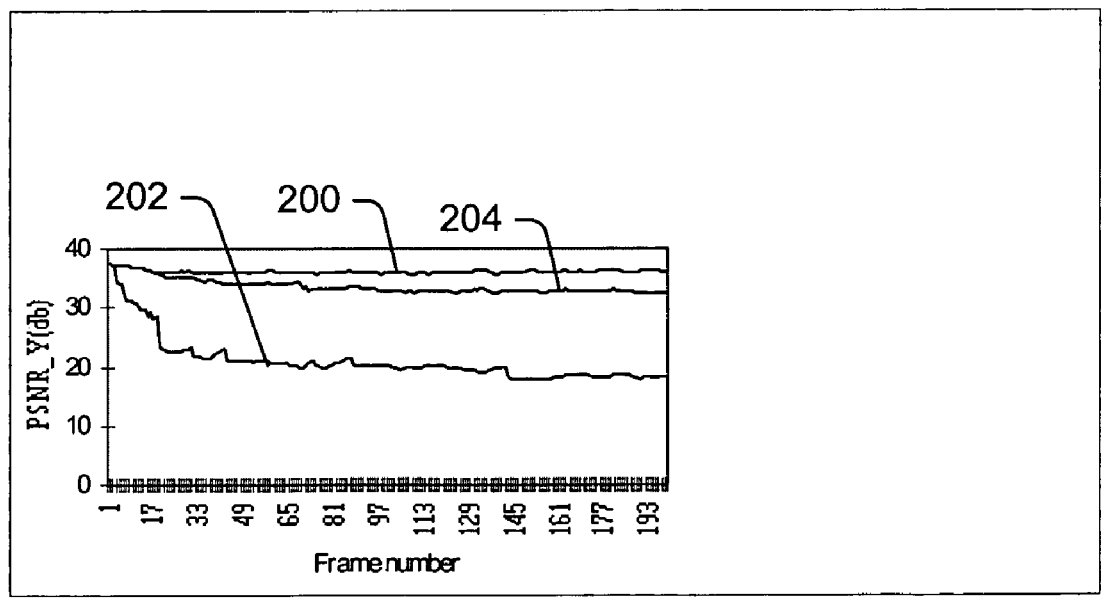
FIG. 8 is a line graph depicting a measured video quality (PSNR) for the two images in FIG. 7 as compared to an original image.

The images in FIG. 7 were produced with a 4.1% data packet loss rate and represent frame number 81. The image on the left was produced using a traditional approach (e.g., random loss), and the image on the right was produced as a result of using exemplary methods and arrangements as taught herein. FIG. 8 shows comparison of peak Signal to noise luminance parameter for every frame between the traditional approach and the present approach with a 4.1% data packet loss rate, wherein line 200 depicts the original quality of the video sequence, line 202 depicts the quality resulting from this new approach, and line 204 represents the quality as a result of a traditional approach.

Figure 9:
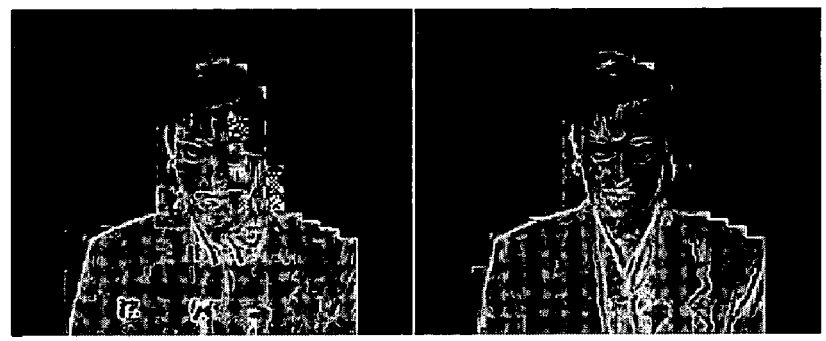
FIG. 9 includes two exemplary video frame images for comparison purposes following a simulated loss of 24.3% of the data packets during transmission, wherein the frame image on the left is noticeably degraded due to the lost data, while the frame image on the right is significantly less degraded due to lost data as a result of the method/arrangement for prioritizing and packetizing a data bitstream.
Figure 10:
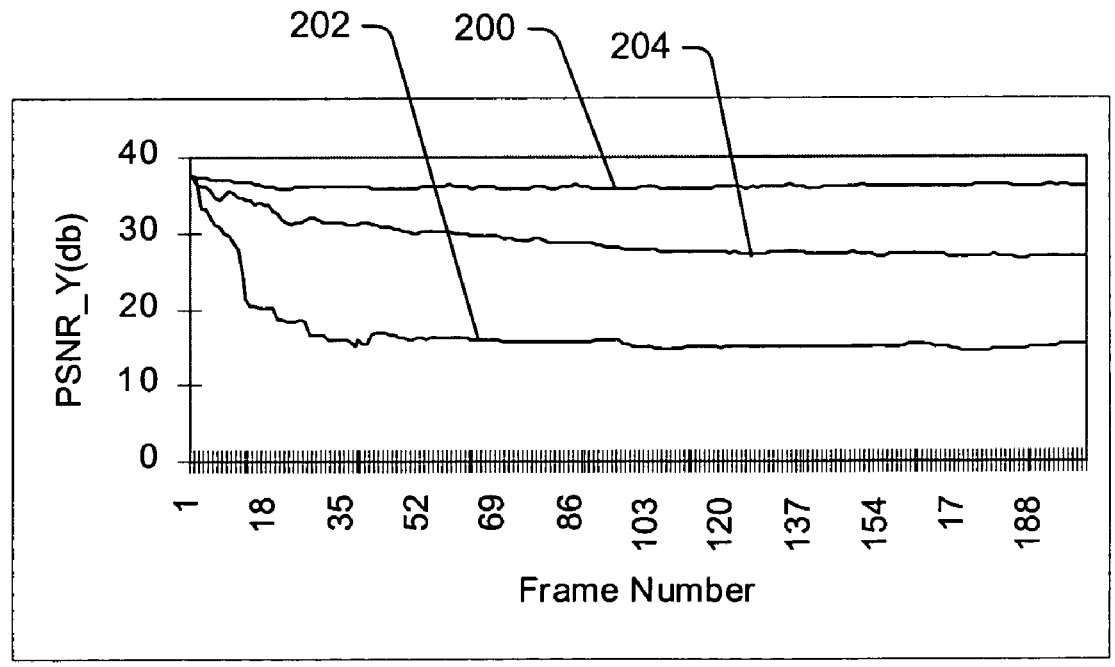
FIG. 10 is a line graph depicting a measured video quality (PSNR) for the two images in FIG. 9 as compared to an original image.

The images in FIG. 9 were produced with a 24.3% data packet loss rate and represent frame number 81. The image on the left was produced using a traditional approach, and the image on the right was produced as a result of this new approach. FIG. 10 shows comparison of peak Signal to noise luminance parameter for every frame between the traditional approach and the new approach with a 24.3% data packet loss rate, wherein line 206 depicts the original quality of the video sequence, line 208 depicts the quality resulting from this exemplary implementation, and line 210 represents the quality as a result of a traditional approach.

Figure 11:
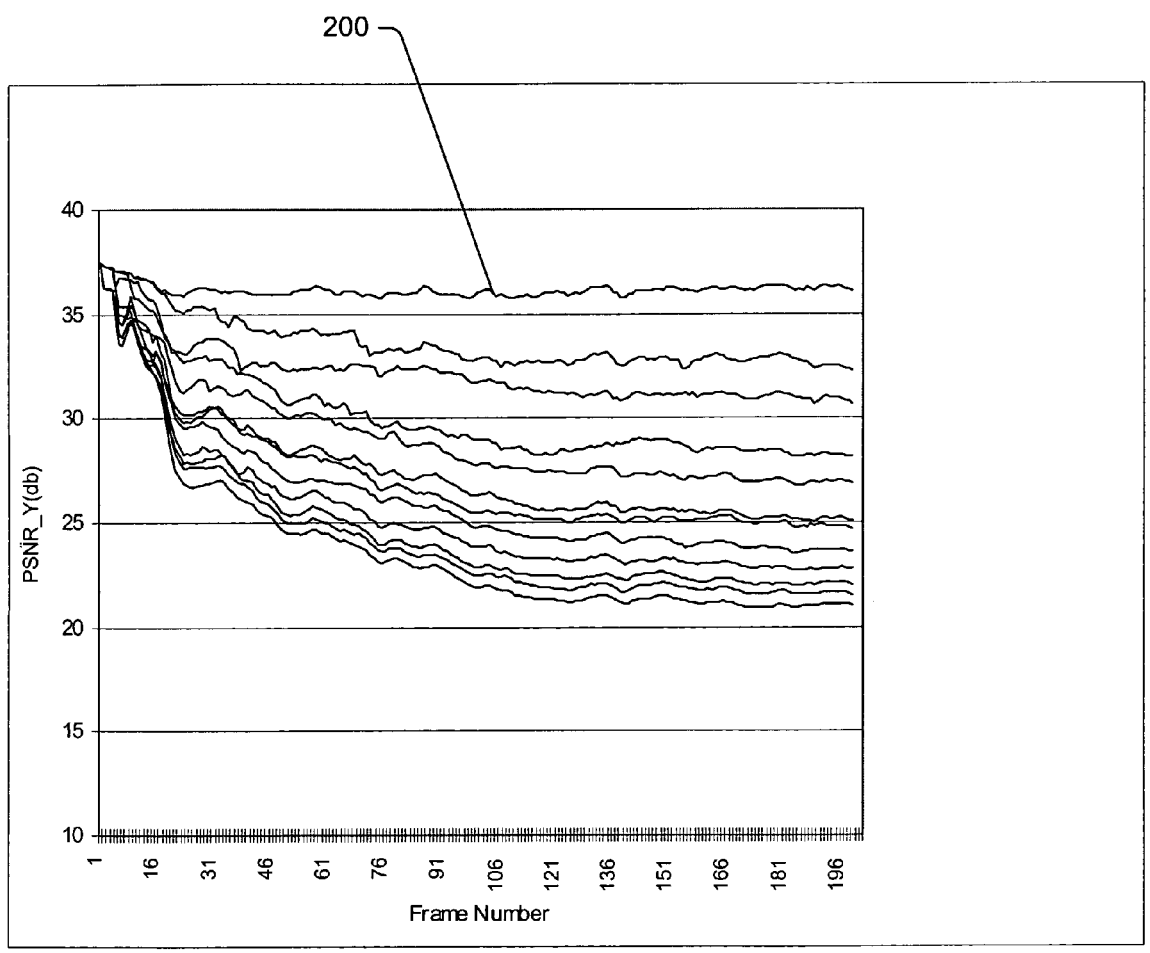
FIG. 11 is a line graph depicting a measured video quality (PSNR) associated with a plurality of different data packet loss rates for the two images in FIGS. 7 and 9, as compared to an original image.

As can be concluded from FIG. 11 the new scalable transmission scheme is feasible to be used in multicasting mechanism because the PSNR of the video does not decrease very much even though the network bandwidth decreases to half of the original video rate.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method comprising:
   receiving a data bitstream that includes object-based media information;
   associating portions of the object-based media information with a plurality of different transmission priority levels;
   selectively transmitting the portions of the object-based media information along with the associated plurality of different transmission priority levels over a network that is configured to provide differential services based at least on the plurality of different transmission priority levels; and
   selectively discarding, within the network that is configured to provide differential services, one or more of the portions of the object-based media information based at least on the associated plurality of different transmission priority levels and on at least one input received from a downstream client.

2. The method as recited in claim 1, wherein the data bitstream includes object-based media information for a single object.

3. The method as recited in claim 2, wherein the single object is a video object.

4. The method as recited in claim 2, wherein the single object is an audio object.

5. The method as recited in claim 1, wherein associating portions of the object-based media information with the plurality of different transmission priority levels further includes:
   placing the portions of the object-based media information in a plurality of data packets, wherein each data packet is associated with a specific transmission priority of the plurality of different transmission priority levels.

6. The method as recited in claim 5, wherein at least one of the plurality of data packets includes non-contiguous portions of data from within the data bitstream.

7. The method as recited in claim 5, wherein selectively transmitting the portions of the object-based media information over the network further includes:
   causing the network to selectively halt the transmission of a first data packet carrying object-based media information that is associated with a first priority level prior to halting the transmission of a second data packet carrying object-based media information that is associated with a second priority level if the second priority level is higher than the first priority level, should a need arise while transmitting the first and second data packets.

8. The method as recited in claim 1, wherein the differential services provide different substantially guaranteed Quality of Service (QoS) transmission capabilities for different transmission priority levels.

9. The method as recited in claim 3, wherein the object-based media information includes a plurality of different types of video frame layers selected from a group that includes Intra (I) coded frame layers, Predicted (P) frame layers, Bi-directionally (B) predicted frame layers, Intra (I) coded frame enhancement layers, Predicted (P) frame enhancement layers, and Bi-directionally (B) predicted frame enhancement layers.

10. The method as recited in claim 9, wherein associating portions of the object-based media information with the plurality of different transmission priority levels further includes:
    setting the transmission priority levels based at least in part on the type of video frame layer.

11. The method as recited in claim 10, wherein setting the transmission priority levels based at least in part on the type of video frame layer further includes:
    causing Intra (I) coded frame layer data to have a higher transmission priority level than Predicted (P) frame layer data;
    causing Predicted (P) frame layer data to have a higher transmission priority level than Bi-directionally (B) predicted frame layer data;
    causing Bi-directionally (B) predicted frame layer data to have a higher transmission priority level than Intra (I) coded frame enhancement layer data;
    causing Intra (I) coded frame enhancement layer data to have a higher transmission priority level than Predicted (P) frame enhancement layer data; and
    causing Predicted (P) frame enhancement layer data to have a higher transmission priority level than Bi-directionally (B) predicted frame enhancement layer data.

12. The method as recited in claim 3, wherein the object-based media information further includes a plurality of different types of video object information selected from a group that includes control information, shape information, motion information and texture information.

13. The method as recited in claim 12, wherein associating portions of the object-based media information with the plurality of different transmission priority levels further includes:
    setting the transmission priority levels based at least in part on the type of video object information.

14. The method as recited in claim 13, wherein setting the transmission priority levels based at least in part on the type of video object information further includes:
    causing at least a portion of the control information to have a higher transmission priority level than at least a portion of the shape information.

15. The method as recited in claim 13, wherein setting the transmission priority levels based at least in part on the type of video object information further includes:
    causing at least a portion of the shape information to have a higher transmission priority level than at least a portion of the motion information.

16. The method as recited in claim 13, wherein setting the transmission priority levels based at least in part on the type of video object information further includes:
    causing at least a portion of the motion information to have a higher transmission priority level than at least a portion of the texture information.

17. The method as recited in claim 13, wherein setting the transmission priority levels based at least in part on the type of video object information further includes:
    causing at least a portion of the texture information to have a higher transmission priority level than at least a portion of the shape information.

18. The method as recited in claim 3, wherein:
    the object-based media information includes a plurality of different types of video frame layers selected from a group that includes Intra (I) coded frame layers, Predicted (P) frame layers, Bi-directionally (B) predicted frame layers, Intra (I) coded frame enhancement layers, Predicted (P) frame enhancement layers, and Bi-directionally (B) predicted flume enhancement layers;
    the object-based media information further includes a plurality of different types of video object information selected from a group that includes control information, shape information, motion information and texture information; and
    wherein associating portions of the object-based media information with the plurality of different transmission priority levels further includes setting the transmission priority levels based at least in part on the type of video frame layer and the type of video object information.

19. The method as recited in claim 18, wherein setting the transmission priority levels based at least in part on the type of video frame layer and the type of video object information further includes:
    setting control information to a class 0 transmission priority level;
    setting shape information and texture DC information of at least one Intra (I) coded frame layer to a class 1 transmission priority level;

setting texture AC information of the Intra (I) coded frame base layer to a class 2 transmission priority level;

setting shape information and motion information of at least one Predicted (P) frame layer to a class 3 transmission priority level;

setting texture information of the Predicted (P) frame layer to a class 4 transmission priority level; and setting shape information, motion information and texture information of at least one Bi-directionally (B) predicted frame base layer to a class 5 transmission priority level, and wherein the class 0 transmission priority level is higher than the class 1 transmission priority level, the class 1 transmission priority level is higher than the class 2 transmission priority level, the class 2 transmission priority level is higher than the class 3 transmission priority level, the class 3 transmission priority level is higher than the class 4 transmission priority level, and the class 4 transmission priority level is higher than the class 5 transmission priority level.

20. The method as recited in claim 1, further comprising:

receiving at least one down-stream preference with regard to the object-based media information; and selectively transmitting at least one of the portions of the object-based media information over the network based on the down-stream preference.

21. The method as recited in claim 1, further comprising:

receiving at least one down-stream preference with regard to the object-based media information; and selectively halting the transmission of at least one of the portions of the object-based media information over the network based on the down-stream preference.

22. The method as recited in claim 1, wherein the data bitstream includes MPEG-4 encoded video data.

23. The method as recited in claim 1, wherein the network is an Internet Protocol (IP) based network.

24. An arrangement comprising:

a server device configured to provide a data bitstream that includes object-based media information having portions of the object-based media information associated with a plurality of different transmission priority levels and that includes identifications of the associated plurality of different transmission priority levels;

at least one client device configured to receive portions of the data bitstream that includes object-media information; and at least one communication network operatively coupled between the server device and the client device, the communication network being configured to provide selective differential services by discarding, within the network, one or more of the portions of the object-based information, based at least on the identifications of the associated plurality of different transmission priority levels of the portions of the object-based media in formation and on at least one input received from the at least one client device.

25. The arrangement as recited in claim 24, wherein the data bitstream includes object-based media information for a single object.

26. The arrangement as recited in claim 25, wherein the single object is a video object.

27. The arrangement as recited in claim 25, wherein the single object is an audio object.

28. The arrangement as recited in claim 24, wherein the server device is further configured to place the portions of the object-based media information in a plurality of data packets, wherein each data packet is associated with a specific transmission priority of the plurality of different transmission priority levels.

29. The arrangement as recited in claim 28, wherein at least one of the plurality of data packets includes non-contiguous portions of data from within the data bitstream.

30. The arrangement as recited in claim 28, wherein the communication network is further configured to selectively halt the transmission of a first data packet carrying object-based media information that is associated with a first priority level prior to halting the transmission of a second data packet carrying object-based media information that is associated with a second priority level if the second priority level is higher than the first priority level, should a need arise while transmitting the first and second data packets.

31. The arrangement as recited in claim 24, wherein the selective differential services provide different substantially guaranteed Quality of Service (QoS) transmission capabilities for different transmission priority levels.

32. The arrangement as recited in claim 26, wherein the object-based media information includes a plurality of different types of video frame layers selected from a group that includes Intra (I) coded frame layers, Predicted (P) frame layers, Bi-directionally (B) predicted frame layers, Intra (I) coded frame enhancement layers, Predicted (P) frame enhancement layers, and Bi-directionally (B) predicted frame enhancement layers.

33. The arrangement as recited in claim 32, wherein the server device is further configured to set the transmission priority levels based at least in part on the type of video frame layer.

34. The arrangement as recited in claim 33, wherein the server device is further configured to:

set Intra (I) coded frame layer data to a higher transmission priority level than Predicted (P) frame layer data;

set Predicted (P) frame layer data to a higher transmission priority level than Bi-directionally (B) predicted fame layer data;

set Bi-directionally (B) predicted frame layer data to a higher transmission priority level than Intra (I) coded frame enhancement layer data;

set Intra (I) coded frame enhancement layer data to a higher transmission priority level than Predicted (P) frame enhancement layer data; and set Predicted (P) frame enhancement layer data to a higher transmission priority level than Bi-directionally (B) predicted frame enhancement layer data.

35. The arrangement as recited in claim 26, wherein the object-based media information further includes a plurality of different types of video object information selected from a group that includes control information, shape information, motion information and texture information.

36. The arrangement as recited in claim 35, wherein the server device is further configured to set the transmission priority levels based at least in part on the type of video object information.

37. The arrangement as recited in claim 36, wherein the server device is further configured to set at least a portion of the control information to a higher transmission priority level than at least a portion of the shape information.

38. The arrangement as recited in claim 36, wherein the server device is further configured to set at least a portion of the shape information to a higher transmission priority level than at least a portion of the motion information.

39. The arrangement as recited in claim 36, wherein the server device is further configured to set at least a portion of the motion information to a higher transmission priority level than at least a portion of the texture information.

40. The arrangement as recited in claim 36, wherein the server device is further configured to set at least a portion of the texture information to a higher transmission priority level than at least a portion of the shape information.

41. The arrangement as recited in claim 26, wherein:
the object-based media information includes a plurality of different types of video frame layers selected from a group that includes Intra (I) coded frame layers, Predicted (P) frame layers, Bi-directionally (B) predicted frame layers, Intra (I) coded frame enhancement layers, Predicted (P) frame enhancement layers, and Bi-directionally (B) predicted frame enhancement layers;
the object-based media information further includes a plurality of different types of video object information selected from a group that includes control information, shape information, motion information and texture information; and
wherein the server device is further configured to set the transmission priority levels based at least in part on the type of video frame layer and the type of video object information.

42. The arrangement as recited in claim 41, wherein the server device is further configured to;
set control information to a class 0 transmission priority level;
set shape information and texture DC information of at least one Intra (I) coded frame layer to a class 1 transmission priority level;
set texture AC information of the Intra (I) coded frame base layer to a class 2 transmission priority level;
set shape information and motion information of at least one Predicted (P) frame layer to a class 3 transmission priority level;
set texture information of the Predicted (P) frame layer to a class 4 transmission priority level; and
set shape information, motion information and texture information of at least one Bi-directionally (B) predicted frame base layer to a class 5 transmission priority level, and
where the class 0 transmission priority level is higher than the class 1 transmission priority level, the class 1 transmission priority level is higher than the class 2 transmission priority level, the class 2 transmission priority level is higher than the class 3 transmission priority level, the class 3 transmission priority level is higher than the class 4 transmission priority level, and the class 4 transmission priority level is higher than the class 5 transmission priority level.

43. The arrangement as recited in claim 24, wherein the network is further configured to:
receive at least one down-stream preference generated within the communication network or by the client device with regard to the object-based media information; and
selectively transmit at least one of the portions of the object-based media information based on the down-stream preference.

44. The arrangement as recited in claim 24, wherein the network is further configured to:
receive at least one down-stream preference generated within the communication network or by the client device with regard to the object-based media information; and
selectively halt the transmission at least one of the portions of the object-based media information based on the down-stream preference.

45. The arrangement as recited in claim 24, wherein the data bitstream includes MPEG-4 encoded video data.

46. The arrangement as recited in claim 24, wherein the network is an Internet Protocol (IP) based network.

47. A method for use in a communications node within a network, the method comprising:
receiving data at the communications node that includes object-based media information that is packetized according to different transmission priority levels, the data including indications of the different transmission priority levels; and
selectively outputting from the communications node portions of the object-based media information and discarding one or more of the portions of the object-based information based at least on the indications of the different transmission priority levels included in the received data and on at least one input received from a downstream client with regard to the object-based media information, wherein the downstream client is configured to receive the outputted portions of the object-based media information, and
wherein the communication node is configured to support differential services that provide different substantially guaranteed Quality of Service(QoS) transmission capabilities for the different transmission priority levels.

48. The method as recited in claim 47, wherein the data bitstream includes object-based media information for a single video object.

49. The method as recited in claim 47, wherein the data bitstream includes object-based media information for a single audio object.

50. The method as recited in claim 47, wherein the object-based media information includes a plurality of different types of video frame layers selected from a group that includes Intra (I) coded frame layers, Predicted (P) frame layers, Bi-directionally (B) predicted frame layers, Intra (I) coded frame enhancement layers, Predicted (P) frame enhancement layers, and Bi-directionally (B) predicted frame enhancement layers.

51. The method as recited in claim 50, wherein the received data is packetized according to different transmission priority levels based at least in part on the type of video frame layer.

52. The method as recited in claim 51, wherein, within the received data, at least one of the following statements is true:
the Intra (I) coded frame layer data has a higher transmission priority level than Predicted (P) frame layer data;
the Predicted (P) frame layer data has a higher transmission priority level than Bi-directionally (B) predicted frame layer data;
the Bi-directionally (B) predicted frame layer data has a higher transmission priority level than Intra (I) coded frame enhancement layer data;
the Intra (I) coded frame enhancement layer data has a higher transmission priority level than Predicted (P) frame enhancement layer data; and
the Predicted (P) frame enhancement layer data has a higher transmission priority level than Bi-directionally (B) predicted frame enhancement layer data.

53. The method as recited in claim 47, wherein the object-based media information further includes a plurality of different types of video object information selected from a group that includes control information, shape information, motion information and texture information.

54. The method as recited in claim 53, wherein the received data is packetized according to different transmission priority levels based at least in part on the type of video object information.

55. The method as recited in claim 54, wherein at least a portion of the control information has a higher transmission priority level than at least a portion of the shape information.

56. The method as recited in claim 54, wherein at least a portion of the shape information has a higher transmission priority level than at least a portion of the motion information.

57. The method as recited in claim 54, wherein at least a portion of the motion information has a higher transmission priority level than at least a portion of the texture information.

58. The method as recited in claim 54, wherein at least a portion of the texture information has a higher transmission priority level than at least a portion of the shape information.

59. The method as recited in claim 47, wherein:
the object-based media information includes a plurality of different types of video frame layers selected from a group that includes Intra (I) coded frame layers, Predicted (P) frame layers, Bi-directionally (B) predicted frame layers, Intra (I) coded frame enhancement layers, Predicted (P) frame enhancement layers, and Bi-directionally (B) predicted frame enhancement layers;
the object-based media information further includes a plurality of different types of video object information selected from a group that includes control information, shape information, motion information and texture information; and
wherein the received data is packetized according to different transmission priority levels based at least in part on the type of video frame layer and the type of video object information.

60. The method as recited in claim 59, wherein:
control information has a class 0 transmission priority level;
shape information and texture DC information of at least one Intra (I) coded frame layer each have a class 1 transmission priority level;
texture AC information of the Intra (I) coded frame base layer has a class 2 transmission priority level;
shape information and motion information of at least one Predicted (P) frame layer each have a class 3 transmission priority level;
texture information of the Predicted (P) frame layer has a class 4 transmission priority level; and
shape information, motion information and texture information of at least one Bi-directionally (B) predicted frame base layer each have a class 5 transmission priority level, and
wherein the class 0 transmission priority level is higher than the class 1 transmission priority level, the class 1 transmission priority level is higher than the class 2 transmission priority level, the class 2 transmission priority level is higher than the class 3 transmission priority level, the class 3 transmission priority level is higher than the class 4 transmission priority level, and the class 4 transmission priority level is higher than the class 5 transmission priority level.

61. The method as recited in claim 47, further comprising:
receiving at least one down-stream preference with regard to the object-based media information; and
selectively outputting at least one of the portions of the object-based media information based on the down-stream preference.

62. The method as recited in claim 47, wherein the received data includes MPEG-4 encoded video data.

63. The method as recited in claim 47, wherein the received data includes Internet Protocol (IP) data.

64. A system comprising:
at least one client device configured to receive prioritized video object-based data packets and output control requests relating to a video object;
at least one server device configured to output prioritized object-based data packets representing the video object, the prioritized object-based data packets being prioritized based at least on part on the type of data as selected from a group comprising control data, shape data, motion data, and texture data; and
at least one video transmission agent (ETA) that is part of a network linking the at least one client device to the at least one server device, the VTA coupled to receive the prioritized object-based data packets from the server device and the control requests from the client device, the VTA adapted to selectively output at least a portion of the received prioritized object-based data packets to the client device based on the prioritization and in response to the control requests.

65. The system as recited in claim 64, further comprising:
a network operatively coupled between the server device and the client device, and wherein the video transmission agent (VTA) is operatively configured within the network.

66. The system as recited in claim 65, wherein the network is further configured to provide differential services to the prioritized object-based data packets, such that prioritized object-based data packets having lower priority levels are selectively dropped should the network become congested.

67. A computer-readable medium having a data structure, comprising:
a first field containing identifying data associated with a portion of a data bitstream that represents a video object;
at least one second field that is derived from the first field and includes data representing object-based video information for the video object that has been classified as having a specific transmission priority level based on at least one type of object-based video information selected from a group comprising control information, shape information, motion information, and texture information; and
a third field comprising a network packet header and containing data identifying the specific transmission priority level of the data in the at least one second field;
wherein a network node is enabled to selectively filter packets based on the specific transmission priority level identified in the third field and responsive to control requests from at least one downstream client that is receiving the video object.

68. A computer-readable medium having computer-executable instructions for performing the steps recited in claim 1.

69. A computer-readable medium having computer-executable instructions for performing the steps recited in claim 47.

70. A method comprising:
receiving a data bitstream that includes object-based media information;

associating portions of the object-based media information with a plurality of different transmission priority levels based, at least in part, on whether a given portion of the object-based media information comprises shape information or texture information; wherein shape information is associated with a higher transmission priority level than texture information within a single frame; and selectively transmitting the portions of the object-based media information over a network that is configured to provide differential services based at least on the plurality of different transmission priority levels; and selectively discarding, within the network that is configured to provide differential services, one or more of the portions of the object-based media information based at least on the plurality of different transmission priority levels and on at least one input received from a downstream client.

* * * * *